(12) United States Patent
Morgan et al.

(10) Patent No.: US 8,678,754 B2
(45) Date of Patent: Mar. 25, 2014

(54) ASSEMBLY FOR PREVENTING FLUID FLOW

(75) Inventors: Victor John Morgan, Simpsonville, SC (US); Rebecca Evelyn Hefner, Greenville, SC (US); Stephen Gerard Pope, Roebuck, SC (US)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 13/012,380

(22) Filed: Jan. 24, 2011

(65) Prior Publication Data

US 2012/0189435 A1   Jul. 26, 2012

(51) Int. Cl.
F01D 11/00 (2006.01)

(52) U.S. Cl.
USPC ........... 415/138; 415/139; 277/644; 277/650; 277/651; 277/652; 277/653; 277/654

(58) Field of Classification Search
USPC ......................................... 415/134, 138, 139
See application file for complete search history.

(56) References Cited

U.S. PATENT DOCUMENTS

| | | | |
|---|---|---|---|
| 3,985,513 A | 10/1976 | Silaev et al. | |
| 4,234,638 A * | 11/1980 | Yamazoe et al. | 428/133 |
| 4,269,903 A | 5/1981 | Clingman et al. | |
| 4,537,024 A * | 8/1985 | Grosjean | 60/791 |
| 5,158,430 A * | 10/1992 | Dixon et al. | 415/134 |
| 5,169,159 A | 12/1992 | Pope et al. | |
| 5,509,669 A | 4/1996 | Wolfe et al. | |
| 5,657,998 A * | 8/1997 | Dinc et al. | 277/653 |
| 5,915,697 A | 6/1999 | Bagepallie et al. | |
| 6,164,904 A | 12/2000 | Abriles et al. | |
| 6,334,617 B1 | 1/2002 | Putnam et al. | |
| 6,502,825 B2 | 1/2003 | Aksit et al. | |
| 6,637,752 B2 | 10/2003 | Aksit et al. | |
| 6,733,234 B2 | 5/2004 | Paprotna et al. | |
| 7,152,864 B2 | 12/2006 | Amos et al. | |
| 7,252,902 B2 | 8/2007 | Bram et al. | |
| 2004/0048137 A1 | 3/2004 | Chou et al. | |
| 2005/0193738 A1 | 9/2005 | Hayakaka et al. | |
| 2007/0048140 A1 | 3/2007 | Farr et al. | |
| 2007/0187907 A1* | 8/2007 | Potier | 277/654 |
| 2008/0145629 A1* | 6/2008 | Anoshkina et al. | 428/213 |
| 2012/0133102 A1* | 5/2012 | Samudrala et al. | 277/654 |

* cited by examiner

*Primary Examiner* — Edward Look
*Assistant Examiner* — Danielle M Christensen
(74) *Attorney, Agent, or Firm* — Cantor Colburn LLP

(57) ABSTRACT

According to one aspect of the invention, an assembly for preventing fluid flow between turbine components includes a shim and a first woven wire mesh layer that includes a first surface coupled to a first side of the shim and a second surface of the woven wire mesh layer opposite the first surface. The assembly also includes a first outer layer coupled to the second surface of the woven wire mesh layer, where the first outer layer includes a high temperature non-metallic material.

12 Claims, 3 Drawing Sheets

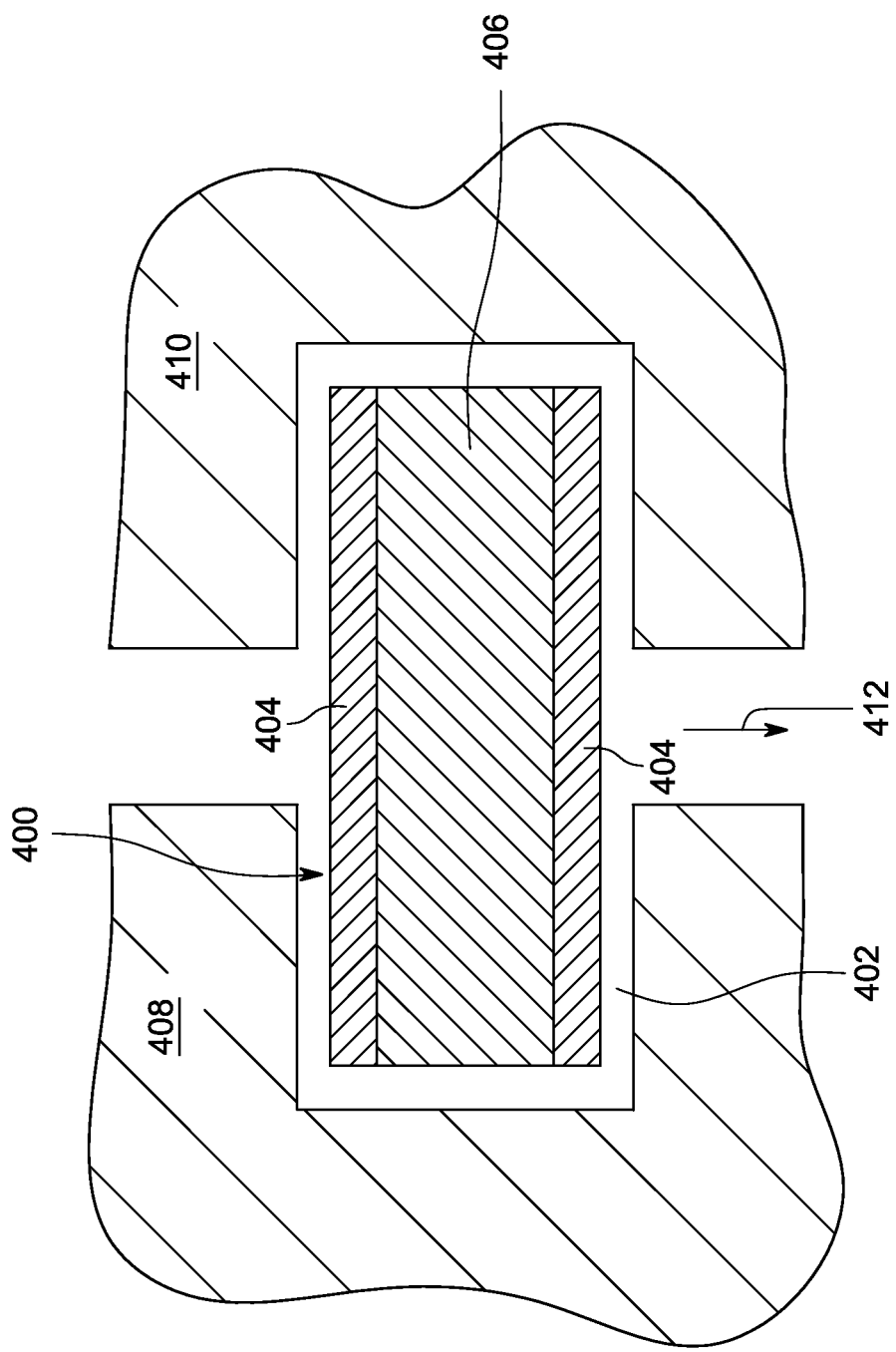

ASSEMBLY FOR PREVENTING FLUID FLOW

BACKGROUND OF THE INVENTION

The subject matter disclosed herein relates to gas turbines. More particularly, the subject matter relates to seals between components of gas turbines.

In a gas turbine, a combustor converts chemical energy of a fuel or an air-fuel mixture into thermal energy. The thermal energy is conveyed by a fluid, often compressed air from a compressor, to a turbine where the thermal energy is converted to mechanical energy. Leakage of the compressed air between turbine parts or components causes reduced power output and lower efficiency for the turbine. Leaks may be caused by thermal expansion of certain components and relative movement between components during operation of the gas turbine. Accordingly, reducing gas leaks between turbine components can improve efficiency and performance of the turbine.

BRIEF DESCRIPTION OF THE INVENTION

According to one aspect of the invention, an assembly for preventing fluid flow between turbine components includes a shim and a first woven wire mesh layer that includes a first surface coupled to a first side of the shim and a second surface opposite the first surface. The assembly also includes a first outer layer coupled to the second surface of the woven wire mesh layer opposite the first surface. The assembly also includes a first outer layer coupled to the second surface of the woven wire mesh layer, where the first outer layer includes a high temperature non-metallic material.

According to another aspect of the invention, a gas turbine includes a first turbine component, a second turbine component adjacent to the first turbine component and a cavity formed between the first and second turbine components. The gas turbine also includes a shim assembly placed within the cavity to prevent fluid flow between the first and second turbine components, the shim assembly comprising a high temperature non-metallic layer disposed on a metallic shim member These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a sectional side view of another embodiment of a seal assembly.

The detailed description explains embodiments of the invention, together with advantages and features, by way of example with reference to the drawings.

DETAILED DESCRIPTION OF THE INVENTION

Figure 1:
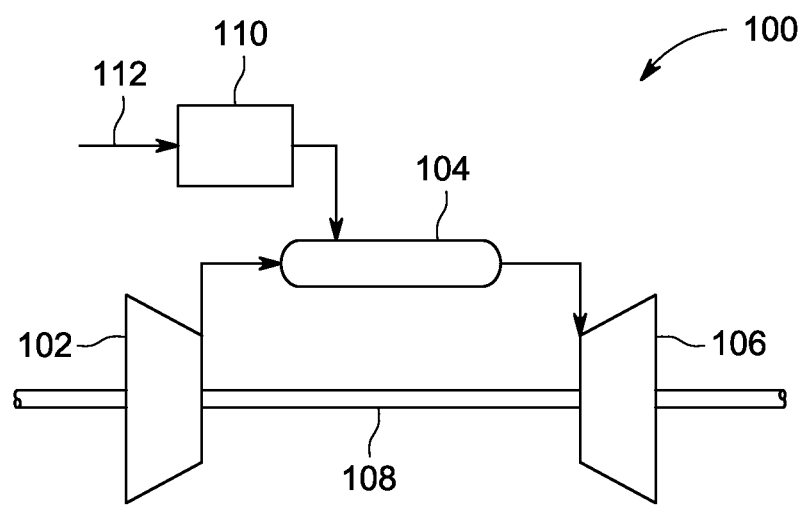
FIG. 1 is a schematic drawing of an embodiment of a gas turbine engine, including a combustor, fuel nozzle, compressor and turbine.

FIG. 1 is a schematic diagram of an embodiment of a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. The compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the engine. For example, fuel nozzles 110 are in fluid communication with an air supply and a fuel supply 112. The fuel nozzles 110 create an air-fuel mixture, and discharge the air-fuel mixture into the combustor 104, thereby causing a combustion that heats a pressurized gas. The combustor 100 directs the hot pressurized exhaust gas through a transition piece into a turbine nozzle (or "stage one nozzle") and then a turbine bucket, causing turbine 106 rotation. The rotation of turbine 106 causes the shaft 108 to rotate, thereby compressing the air as it flows into the compressor 102. The turbine components or parts are joined by seals or seal assemblies configured to allow for thermal expansion and relative movement of the parts while preventing leakage of the gas. Specifically, reducing leakage of compressed gas flow between turbine components increases hot gas flow along the desired path, enabling work to be extracted from more of the hot gas, leading to improved turbine efficiency. Seals and seal assemblies for placement between turbine parts are discussed in detail below with reference to FIGS. 2-4.

Figure 2:
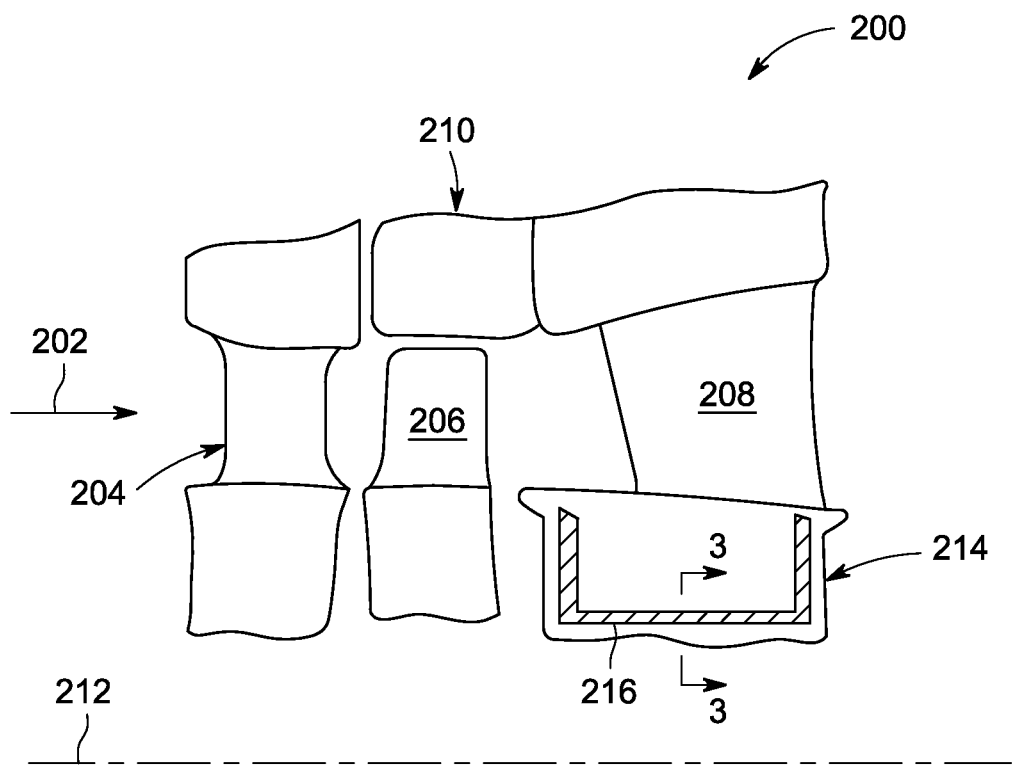
FIG. 2 is a side view of an embodiment of a portion of a gas turbine, including components along a hot gas path.

FIG. 2 is a side view of an embodiment of a portion of a gas turbine 200, showing components along a hot gas 202 path or flow. The gas turbine 200 includes a nozzle 204, bucket 206 (also called a "blade" or "vane"), nozzle 208 and shroud 210, wherein the hot gas 202 flows through the vane or airfoil-shaped nozzles and buckets to cause rotation of rotors about an axis 212. As depicted, the bucket 206 and shroud 210 are part of a rotor assembly between two stators, wherein the stator assemblies include nozzles 204 and 208. The nozzle 204 and bucket 206 are described as stage one components, while nozzle 208 is a stage two component of the turbine 200. The nozzle 208 is positioned on a diaphragm 214 of the stator assembly. A seal assembly 216 is at least partially positioned in the diaphragm 214 to prevent leakage of hot gas 202 from the path that includes buckets 206 and nozzles 204 and 208. The seal assembly 216 is positioned between adjacent diaphragm components that are circumferentially positioned about axis 212. The gas turbine 200 may include a plurality of seal assemblies 216 located between adjacent components to prevent leakage of hot gas 202 from the desired flow path. Exemplary turbine components include stator components, rotor components and transition piece components.

Figure 3:
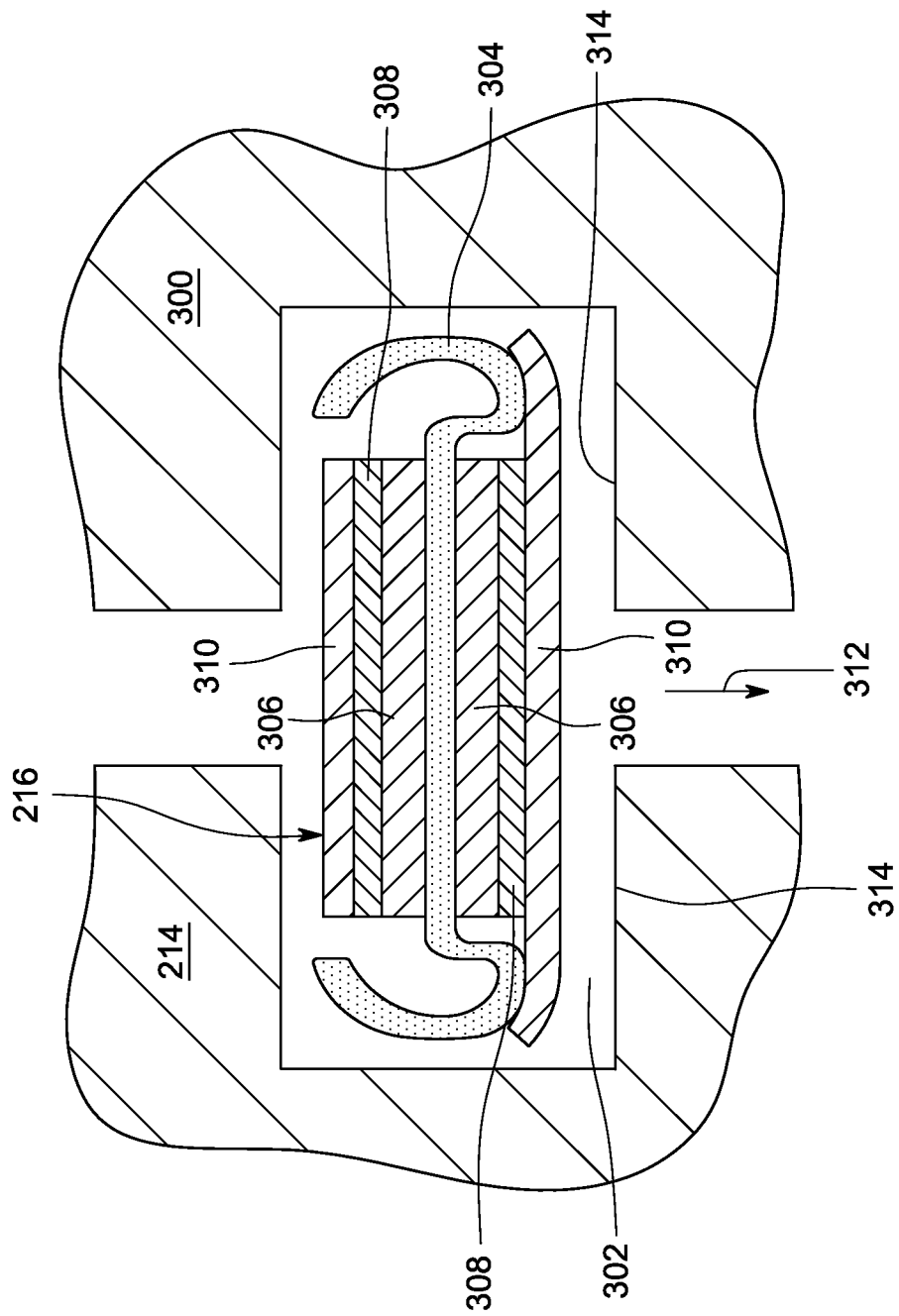
FIG. 3 is a sectional side view of an embodiment of a seal assembly.

FIG. 3 is a side sectional view of the seal assembly 216 positioned between adjacent turbine components or parts 214 and 300. The seal assembly 216 is positioned in a cavity 302 formed between the turbine components 214 and 300. The seal assembly 216 includes a shim 304, first layer 306, second layer 308 and outer layer 310. In an embodiment, the shim 304 is member formed from a high temperature material, such as a metal alloy, stainless steel, or nickel-based alloy. The shim 304 member includes a middle portion with two surfaces and raised longitudinal edges, wherein recesses are formed by the raised longitudinal edges for placement of the layers 306 and 308. The first layer 306 and second layer 308 each comprise a metallic woven wire mesh or cloth metallic material. As depicted, the first layer 306 and second layer 308 are positioned on each surface or side of the shim 304. The first layer 306 and second layer 308 are coupled to one another and the shim 304 via high temperature couplings, such as welds, brazes or high temperature adhesives. The outer layer 310 comprises a high temperature non-metallic material that is configured to improved sealing of the seal assembly 216. In one embodiment, the outer layer 310 comprises a mica-based or graphite-based material.

In aspects, the seal assembly 216 includes the first layer 306, second layer 308 and outer layer 310 positioned on one surface of the shim 304. Further, another embodiment of seal assembly includes the first layer 306 and outer layer 310 positioned on one or both surfaces of the shim 304, wherein the second layer 308 is not included. In yet another embodiment, the outer layer 310 is disposed on the shim 304, without first layer 306 or second layer 310. The outer layer 310 is coupled to the components of seal assembly 216 by any suitable high temperature-resistant mechanism, such as high temperature adhesives or high strength durable fasteners. Alternatively, one or more portions of the shim 304 can be wrapped to substantially surround or constrain the outer layer 310. In an embodiment, as hot gas flows through gas turbine 200 (FIG. 2), the gas flow pressures the seal assembly 216 to move in a direction 312 into contact with turbine components 214 and 300. Further, when contacting the components 214 and 300, the high temperature non-metallic material of outer layer 310 provides and reduction of gas flow through the seal assembly 216 by reducing the effective gap between the seal assembly 216 and the components 214 and 300.

FIG. 4 is a side sectional view of an exemplary seal assembly 400 positioned between adjacent turbine components or parts 408 and 410. The seal assembly 400 is positioned in a cavity 402 formed between the turbine components 408 and 410. The seal assembly 400 includes outer layer 404 disposed on base layer 406. The outer layer 404 comprises a high temperature non-metallic material that is configured to improved sealing of the seal assembly 400. In one embodiment, the outer layer 404 comprises a mica-based or graphite-based material. The base layer 406 comprises a high temperature material, such as a metal alloy, stainless steel, or nickel-based alloy. The outer layer 404 is coupled to the base layer 406 via any suitable high temperature-resistant mechanism, such as high temperature adhesives or high strength fasteners. In an embodiment, as hot gas flows through gas turbine 200 (FIG. 2), the gas flow pressures the seal assembly 400 to move in a direction 412 into contact with turbine components 408 and 410. When contacting the components 408 and 410, the high temperature non-metallic material of outer layer 404 provides a reduced effective gap between components and reduces gas flow through the seal assembly 400. In an embodiment, the outer layer 404 comprises a mica-based or graphite-based material. An exemplary outer layer 404 is a non-metallic material configured to provide a seal between turbine components at high temperatures, such as greater than about 700 degrees Fahrenheit.

As depicted in FIGS. 3 and 4, the high temperature non-metallic material of outer layer 310 and 404 reduces fluid flow through the seal assemblies 216 and 400. The high temperature non-metallic material layer is disposed on one or more sides of any type of static-static seal, such as those including the shim 304 and mesh layers 306, 308 as well as base layer 406. Fluid flow, including hot gas flowing through the turbine 200 (FIG. 2), is reduced due to improved contact and sealing provided by outer layer 310 and 404 when contacting the turbine components (214, 300, 408, 410). In addition, exemplary embodiments of the shim 304 and base layer 406 may be referred to as a substantially rigid metallic body wherein the outer layers 310 and 404 are disposed on the shim 304 and base layer 406, respectively. As depicted in FIG. 3, the outer layer 310 is disposed on one or more layers, such as first layer 306 and second layer 308. As shown in FIGS. 3 and 4, the seal assemblies 216 and 400 are configured to sealingly engage one or more turbine parts (214, 300, 408, 410) to prevent fluid flow through cavities 302 and 402. For example, the seal assembly 216 may contact an inner wall 314 of the turbine parts 214 and 300 to prevent or reduce fluid flow. In embodiments, the high temperature non-metallic material is substantially impermeable, even at elevated temperatures, thereby providing improved contact area with the turbine components and a resulting improved seal. The increased sealing effectiveness of the seal assembly 216 results from a decreased effective leakage area provided by the non-metallic material. The decreased effective leakage area is a result of a larger contact area and small amount of deformation of the layer high temperature non-metallic material.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An assembly for preventing fluid flow between turbine components, the assembly comprising:
   a shim;
   a first woven wire mesh layer comprising a first surface coupled to a first side of the shim and a second surface of the woven wire mesh layer opposite the first surface;
   a second woven wire mesh layer including a first surface coupled to the second surface of the first woven wire mesh layer and a second, opposing surface; and
   a first outer layer coupled to the second surface of the second woven wire mesh layer, where the first outer layer comprises a high temperature non-metallic material including one of a mica based material and a graphite based material.

2. The assembly of claim 1, wherein the shim comprises a member with raised longitudinal edges, wherein the raised longitudinal edges form at least one recess on the first side of the shim.

3. The assembly of claim 1, wherein the assembly is configured to sealingly engage the turbine components, thereby preventing fluid flow.

4. An assembly for preventing fluid flow between stator parts of a gas turbine, the assembly comprising:
   a substantially rigid metallic body having a first surface and an opposing second surface;
   a first woven wire mesh layer including a first surface coupled to the first surface of the substantially rigid metallic body and a second, opposing surface;
   a second woven wire mesh layer including a first surface coupled to the second surface of the first woven wire mesh layer and a second, opposing surface;
   a first outer layer coupled to the second surface of the second woven wire mesh layer, the first outer layer comprises a high temperature non-metallic material; and
   a second outer layer coupled to the second surface of the substantially rigid metallic body, the second outer layer comprising a high temperature non-metallic material, wherein at least one of the first and second outer layer includes one of a mica based material and a graphite based material.

5. A gas turbine comprising:

a first turbine component;

a second turbine component adjacent to the first turbine component;

a cavity formed between the first and second turbine components; and a shim assembly placed within the cavity to prevent fluid flow between the first and second turbine components, the shim assembly comprising first and second woven wire mesh layers and a high temperature non-metallic outer layer disposed on a metallic shim member, wherein the high temperature non-metallic outer layer includes one of a mica based material and a graphite based material.

6. The gas turbine of claim 5, wherein the first and second turbine components comprise stator components.

7. The gas turbine of claim 5, wherein the metallic shim member comprises a member with raised longitudinal edges.

8. The gas turbine of claim 7, wherein the raised longitudinal edges form at least one recess in the metallic shim member.

9. The gas turbine of claim 5, wherein the first and second woven wire mesh layers and high temperature non-metallic layer are disposed on each side of the metallic shim member.

10. The assembly of claim 1, further comprising:

a third woven wire mesh layer comprising a first surface coupled to a second opposing side of the shim and a second opposing surface;

a fourth woven wire mesh layer including a first surface coupled to the second surface of the third woven wire mesh layer and a second, opposing surface; and a second outer layer coupled to the second surface of the fourth woven wire mesh layer, where the first outer layer comprises a high temperature non-metallic material.

11. The assembly of claim 10, wherein the high temperature non-metallic material of the second outer layer comprises a mica based material.

12. The assembly of claim 10, wherein the high temperature non-metallic material of the second metallic layer comprises a graphite based material.

* * * * *